United States Patent [19]

Koeble

[11] 4,217,434

[45] Aug. 12, 1980

[54] PRESSURE SENSITIVE ADHESIVE FORMULATION

[75] Inventor: Earl A. Koeble, Anderson, S.C.

[73] Assignee: Stauffer Chemical Company, Westport, Conn.

[21] Appl. No.: 947,789

[22] Filed: Oct. 2, 1978

[51] Int. Cl.$^2$ .............................................. C08K 5/52
[52] U.S. Cl. .................................... 525/329; 156/326; 156/332; 260/32.8 R; 260/33.4 R; 260/33.6 UA; 428/354; 428/355; 525/2; 525/340
[58] Field of Search .................. 526/2, 16, 27; 525/2, 525/329, 340; 260/32.8 R, 33.4 R, 33.6 UA

[56] References Cited

U.S. PATENT DOCUMENTS

| | | | |
|---|---|---|---|
| 3,341,343 | 9/1967 | Beiswanger et al. | 526/2 |
| 3,515,578 | 6/1970 | Tomita et al. | 260/45.75 |
| 3,615,106 | 10/1971 | Flanagan et al. | 260/23 AR |

FOREIGN PATENT DOCUMENTS 638522   4/1964   Belgium .

OTHER PUBLICATIONS

Chem. Abs. 82 (1975), p. 59140s.

*Primary Examiner*—Harry Wong, Jr.
*Attorney, Agent, or Firm*—Richard P. Fennelly

[57] ABSTRACT

The adhesion of acrylic pressure sensitive adhesives to plastic substrates is improved by the presence of the adhesive of an effective amount for such adhesion improvement, e.g., from about 0.3% to about 4.0%, by weight of the adhesive when in liquid form, of a monoalkyl acid phosphate.

5 Claims, No Drawings

PRESSURE SENSITIVE ADHESIVE FORMULATION

BACKGROUND OF THE INVENTION

1. Field of the Invention

The present invention is an improved pressure sensitive adhesive formulation having improved adhesion to plastic substrates.

2. Description of the Prior Art

Pressure sensitive adhesives containing natural or synthetic rubber-based elastomers have been conventionally used to bond pressure sensitive products to plastic substrates, such as polyolefin substrates. Such rubber-based adhesives have the desired adhesion values, but do not generally have the exterior durability characteristics which may be required. Although acrylic pressure sensitive adhesives have generally superior exterior durability as compared to rubber-based pressure sensitive adhesives, they have not heretofore had the desired adhesion values to certain plastic, e.g., polyolefinic, substrates. Hence, a need exists for an acrylic pressure sensitive adhesive having improved adhesion to plastic substrates.

SUMMARY OF THE PRESENT INVENTION

The present invention is an improved acrylic pressure sensitive adhesive formulation having increased adhesion characteristics when bonded to a plastic, e.g., polyolefinic, substrate which comprises an effective amount for such improved adhesion of a monoalkyl acid phosphate. Generally, the amount of such monoalkyl acid phosphate will range from about 0.3% to about 4.0%, by weight of the adhesive formulation when it is in liquid form. Preferred phosphate compounds include the monoloweralkyl acid phosphates containing from 1 to 4 carbon atoms in the alkyl group.

DETAILED DESCRIPTION OF PREFERRED EMBODIMENTS OF THE INVENTION

Acrylic pressure sensitive adhesive formulations are a well-known class of compositions. They are initially liquid adhesive formulations which generally contain the following components:

(1) from about 45% to about 65%, by weight of the formulation, of a suitable organic solvent in which the other components of the formulation can be dissolved. This solvent enables the person of ordinary skill in the art to apply the adhesive formulation to a desired substrate by suitable means (e.g., a knife, trailing blade, reverse roll, gravure coating, etc.) in the manufacture of pressure sensitive adhesive products. Representative solvents include: the alcohols, e.g., the lower alkanols such as ethanol, propanol, isopropanol and butanol; other alcohol solvents, such as methyl cellosolve, butyl cellosolve, diacetone alcohol, and the like; ester solvents; ketone solvents, such as methyl ethyl ketone; hydrocarbon solvents, such as hexane, cyclohexane, heptane, toluene, and the like;

(2) from about 16% to about 45%, by weight of the formulation, of a polyacrylate elastomer component. Such elastomer components are well known to persons of ordinary skill in the adhesive art and are generally alkyl, e.g., $C_4$–$C_{12}$ alkyl, esters of either acrylic or methacrylic acid optionally copolymerized with such co-polymerizable monomers as one or more of: the hydroxyalkyl acrylates or methacrylates; acids, such as acrylic, methacrylic, itaconic, or crotonic acid; vinyl esters, such as vinyl acetate; the lower alkyl, e.g., the $C_1$–$C_4$ alkyl, acrylates; and glycidyl compounds, such as, glycidyl acrylate, glycidyl methacrylate, glycidyl allyl ether, and the like. Representative polyacrylate elastomer components of this type are shown in the following U.S. Pat. Nos.: 3,269,994 to M. B. Horn et al.; 3,284,423 to E. C. Knapp; 3,532,708 to R. B. Blance; 3,579,490 to S. Kordzinaki et al.; and 4,005,247 to C. M. Graham;

(3) from about 0% to about 20% by weight of the formulation of a compatible tackifier for the polyacrylic elastomer component. Representative tackifiers include: polyterpene resins; gum rosin; rosin esters and other rosin derivatives; oil soluble phenolic resins; coumarone-indene resins; petroleum hydrocarbon resins; and the like; and (4) up to about 5%, by weight, of the formulation of one or more of the following functional additives: plasticizers (e.g., the alkyl phthalates, liquid polybutenes, liquid polyacrylates, vinyl ether, etc.); fillers (e.g., titanium dioxide, aluminum hydrate, the silicates, clay, pigments, etc.); antioxidants (e.g., rubber antioxidants, metal dithiocarbamates, metal chelating agents, etc.); and the like.

The above described liquid adhesive formulations are formed into a dry, but tacky, pressure sensitive adhesive formulation, which is generally in the form of a thin (e.g., from 0.01 to 0.05 mm.) layer, in the pressure sensitive product (e.g., pressure sensitive film or tape) by applying the liquid adhesive formulation to a desired substrate and drying the liquid formulation to remove the organic solvent therefrom.

In accordance with the present invention, it has been found that the incorporation of an effective amount of a monoalkyl acid phosphate in the liquid and, consequently, the aforementioned dried acrylic pressure sensitive adhesive layer, results in an increased adhesion of the dried adhesive layer to plastic, e.g., polyolefinic, substrates. Generally, the amount of monoalkyl acid phosphate which is used can range from about 0.3% to about 4.0%, by weight, based on the weight of the liquid adhesive formulation, and from about 0.5% to about 10%, by weight of the dried adhesive layer. Preferred monoalkyl acid phosphates for use herein are the monoloweralkyl acid phosphates containing from 1 to 4 carbon atoms in the alkyl group.

The monoalkyl acid phosphate additive can be simply added to the liquid acrylic pressure sensitive adhesive formulation if it is purchased in fully formulated form from a commercial supplier, or alternatively, can be added to the adhesive formulation while it is being manufactured.

The present invention is illustrated by the following Examples which are presented for purposes of illustration only and which should therefore not be construed in a limiting sense.

(COMPARATIVE) EXAMPLE 1

This Example is presented for comparative purposes and illustrates the formation of a conventional tackified, acrylic pressure sensitive adhesive formulation and its placement in a pressure sensitive product comprising a vinyl film, adhesive layer, and release paper.

The adhesive formulation was first formed by combining: (1) 106 parts by weight of a modified acrylic polymer solution (AROSET 1085, from Ashland Chemicals) for a pressure sensitive adhesive, said solution having a percent solids content of about 45%, by weight, in an ethyl acetate/toluene solvent (75/25 on a weight basis); and (2) 22 parts by weight of a mixture of about 67%, by weight, of a stabilized tackifier derived from rosin based esters of polyhydric alcohols (FORAL F-85, from Hercules Powder Co.) and about 33%, by weight, of toluene.

The adhesive formulation was then applied by solvent casting the adhesive formulation onto release paper, drying the formulation to form a layer having a thickness of about 2 mils and laminating the release paper/adhesive layer combination to a vinyl film backing.

EXAMPLES 2–5

These Examples illustrate formation of a series of adhesive formulations made in accordance with the present invention and the inclusion of a layer of such pressure sensitive adhesives in pressure sensitive products similar to those in Example 1.

Adhesive formulations were prepared by adding varying amounts of monoethyl acid phosphate to the adhesive formulation of Example 1 as described below. All amounts are given in parts by weight:

| Ingredients | EXAMPLE | | | |
|---|---|---|---|---|
| | 2 | 3 | 4 | 5 |
| Adhesive Formulation (from Example 1) | 100 | 100 | 100 | 100 |
| Monoethyl acid phosphate | 0.5 | 1.0 | 2.0 | 3.0 |

Each of the adhesive formulations described in Examples 2–5 was then placed in the type of pressure sensitive product of Example 1 using the procedure of that Example.

EXAMPLE 6

This Example illustrates the generally increased peel adhesion to a polyethylene substrate for the products of Examples 2–5 as compared to the control film of Example 1.

The peel adhesion of the product was determined by bonding 2.54 cm. width by 25.4 cm. length strips of the polyvinyl chloride film/adhesive layer laminate (after removal of the release liner) to a polyethylene panel using the Standard Pressure Sensitive Tape Council 2.04 kg. roller. Peel adhesion at 180° was then measured after a 20 minute wetout or "dwell" period on a Thwing-Albert type tester using a jaw separation rate of 300 mm/min.

The Table given below sets forth the adhesion values (given in gm./cm.) for the products of Example Nos. 1–5 after a dwell time of 20 minutes on the substrate.

| Example No. | 1 | 2 | 3 | 4 | 5 |
|---|---|---|---|---|---|
| Adhesion | 770 | 1070–1250 | 1250–1780 | 1430–1610 | 1070–1610 |

The value given for Example No. 1 is an average value for the adhesion whereas the ranges given for Example Nos. 2–5 show the lowest and highest adhesion values noted as the sample was peeled from the substrate.

(COMPARATIVE) EXAMPLE 7

This Example is presented for comparative purposes and illustrates the formation of a conventional, non-tackified, acrylic pressure sensitive adhesive formulation and its placement in a pressure sensitive product comprising a vinyl film, adhesive layer, and release paper. It is generally similar to Comparative Example 1 with the absence of the rosin based tackifier component.

The adhesive formulation that was employed was the same modified acrylic polymer solution (AROSET 1085) that was used in forming the tackified adhesive formulation of Comparative Example 1. The same procedure was used to form the release paper/adhesive layer/vinyl film backing product.

EXAMPLES 8–12

These Examples illustrate the formation of a series of adhesive formulations made in accordance with the present invention, which do not contain the rosin based tackifier described in Comparative Example 1, and the inclusion of a layer of such pressure sensitive adhesives in pressure sensitive products similar to those of Examples 1–6.

Adhesive formulations were prepared by adding varying amounts of monoethyl acid phosphate to the adhesive formulation of Example 7 as described below. All amounts are given in parts by weight:

| Ingredients | EXAMPLE | | | | |
|---|---|---|---|---|---|
| | 8 | 9 | 10 | 11 | 12 |
| Adhesive Formulation (from Example 7) | 100 | 100 | 100 | 100 | 100 |
| Monoethyl acid phosphate | 0.24 | 0.42 | 0.6 | 1.2 | 2.4 |

EXAMPLE 13

This Example illustrates the generally increased peel adhesion to a polyethylene substrate for the products of Examples 8–12 as compared to the control film of Example 7 when tested in accordance with the procedure that is described in Example 6.

The Table given below sets forth the adhesion values (given in gm./cm.) for the products of Example Nos. 7–12 after a dwell time of 20 minutes on the substrate:

| Example No. | 7 | 8 | 9 | 10 | 11 | 12 |
|---|---|---|---|---|---|---|
| Adhesion Value | 360 | 450 | 720–890 | 1660 | 1560 | 1320 |

The adhesion values for Example Nos. 7, 8 and 10–12 are average adhesion values whereas the range given for Example No. 9 gives the highest and lowest adhesion values observed as the sample was peeled from the substrate.

The foregoing Examples are merely exemplary of certain embodiments of the present invention and should not be construed in a limiting sense. The scope of protection that is sought is set forth in the Claims which follow.

What is claimed is:

1. An improved liquid acrylic pressure sensitive adhesive formulation which comprises a polyacrylate elastomer component and which, when in dried form in a pressure sensitive product, has increased adhesion to a plastic substrate due to the presence in said adhesive formulation of an effective amount for said adhesion of a monoloweralkyl acid phosphate.

2. A formulation as claimed in claim 1 wherein the monoalkyl acid phosphate comprises from about 0.3% to about 4.0%, by weight of the liquid formulation.

3. A formulation as claimed in claim 1 which is in dried form in a pressure sensitive product and which comprises from about 0.5% to about 10%, by weight of the monoalkyl acid phosphate.

4. A formulation as claimed in either claim 1 or 2 or 3 wherein the monoalkyl group contains from 1 to 4 carbon atoms.

5. A formulation as claimed in either claim 1 or 2 or 3 wherein the monoalkyl group is a monoethyl group.

* * * * *